United States Patent
Scheithauer et al.

(10) Patent No.: US 6,471,594 B2
(45) Date of Patent: Oct. 29, 2002

(54) FLEXIBLE ALL-STEEL SHAFT COUPLING

(75) Inventors: Gunter Scheithauer, Vreden; Ewald Valtwies, Sudlohn; Patrice Millet; Rudolf Weiss, both of Vreden, all of (DE)

(73) Assignee: Atec-Weiss GmbH & Co. KG, Vreden (DE)

( * ) Notice: Subject to any disclaimer, the term of this patent is extended or adjusted under 35 U.S.C. 154(b) by 0 days.

(21) Appl. No.: 09/839,261

(22) Filed: Apr. 20, 2001

(65) Prior Publication Data

US 2001/0049307 A1 Dec. 6, 2001

Related U.S. Application Data

(63) Continuation of application No. 09/385,234, filed on Aug. 30, 1999, now abandoned.

(30) Foreign Application Priority Data

Aug. 29, 1998 (DE) .......................... 198 39 400

(51) Int. Cl.[7] ................................. F16D 3/79
(52) U.S. Cl. ......................... 464/99; 403/344
(58) Field of Search ...................... 464/69, 95, 99, 464/137, 138, 147, 182; 403/344; 411/338, 339, 366.1

(56) References Cited

U.S. PATENT DOCUMENTS

| | | | |
|---|---|---|---|
| 1,326,993 A | 1/1920 | Thomas | 464/99 |
| 1,656,935 A | * 1/1928 | Bahan | 403/344 X |
| 4,482,335 A | * 11/1984 | Goody | 464/69 X |
| 4,708,692 A | 11/1987 | Weiss | 464/69 |
| 4,747,723 A | 5/1988 | Hasley | 403/337 |
| 5,545,090 A | 8/1996 | Kirschey | 464/96 |

FOREIGN PATENT DOCUMENTS

| | | |
|---|---|---|
| DE | 1 284 710 | 12/1968 |
| DE | 3417801 A1 | 11/1985 |
| JP | 07063227 | 3/1995 |
| JP | 11051070 | 2/1999 |

OTHER PUBLICATIONS

Tender documents of Chr. Mayr GmbH & Co. KG, dated Jan. 4, 2000, contains several drawings disclosing flexible shaft couplings.

* cited by examiner

*Primary Examiner*—Greg Binda
(74) *Attorney, Agent, or Firm*—Dick and Harris

(57) ABSTRACT

A flexible all-steel shaft coupling includes two connecting flanges (1, 2) and an intermediate piece (3, 3') arranged between the connecting flanges, with a disk ring (4, 5) being arranged between each of the two connecting flanges and the intermediate piece; said disk ring being connected alternately to the respective connecting flange and the intermediate piece, by means of circumferentially-distributed studs (6, 7, 7') and tension sleeves (8, 9), each comprising a radially protruding end stop, (13, 14), as well as spacer rings (10) held on the tension sleeves, so that the connecting flanges are interconnected so as to be torsionally rigid but with angular movement and axial movement; with each of the studs (6) connected to the connecting flanges being associated with only a single tension sleeve.

7 Claims, 4 Drawing Sheets

FLEXIBLE ALL-STEEL SHAFT COUPLING

CROSS-REFERENCE TO RELATED APPLICATIONS

This application claims the benefit as a continuation of U.S. application Ser. No. 09/385,234, filed Aug. 30, 1999, now abandoned.

FIELD OF THE INVENTION

The invention relates to a flexible all-steel shaft coupling comprising two connecting flanges and an intermediate piece arranged between the connecting flanges, with a disk ring being arranged between each of the two connecting flanges and the intermediate piece; said disk ring being connected alternately to the respective connecting flange and the intermediate piece, by means of circumferentially-distributed studs and tension sleeves, each comprising a radially protruding end stop, as well as spacer rings held on the tension sleeves, so that the connecting flanges are interconnected so as to be torsionally rigid but with angular movement and axial movement; with each of the studs connected to the connecting flanges being associated with only a single tension sleeve.

DESCRIPTION OF THE PRIOR ART

Such a shaft coupling is for example known from DE 34 43 485 A1. This coupling has basically proven reliable in practical experience. It has however been shown that due to its dimensions it cannot be installed, or only installed with difficulty, in conditions of confined space, between the extremities of the shafts to be connected.

It is thus the object of the invention to improve a shaft coupling of the type mentioned in the introduction, such that it is of compact design and can easily be installed and deinstalled in confined spaces.

With a generic shaft coupling this object is met in that each of the tension sleeves associated with the studs connected to the connecting flanges, comprises an internal screw thread for screwing the stud; that the intermediate piece is an intermediate ring; and that at each of the two connecting flanges, pairs of coupling shells are arranged, with the shell of each pair of coupling shells being constructed in a single piece together with the associated connecting flange.

SUMMARY OF THE INVENTION

The all-steel shaft coupling according to the invention is characterised by a very short and compact design, as well as by few individual components. It can be installed or deinstalled simply, in confined spaces, without the two shafts to be connected having to be moved apart in axial direction.

According to a preferred embodiment, the connection of the disk rings with the intermediate ring can take place in such a way that the studs connected to the intermediate ring are screwed into threaded bore holes provided in the intermediate ring. This embodiment does not require any nuts for attaching the studs associated with the intermediate ring, thus considerably facilitating installation or deinstallation of the coupling.

Another advantageous embodiment in relation to attachment of the disk rings to the intermediate ring is characterised in that the studs connected to the intermediate ring in each instance connect both disk rings to the intermediate ring. This embodiment provides the advantage of particularly fast installation because the intermediate ring can be attached with only a few screws between the preinstalled left coupling section and the preinstalled right coupling section. Preferably only three screws are required for installing or deinstalling the preinstalled coupling sections. Furthermore, this embodiment allows installation or deinstallation of the shaft coupling even where the space between the extremities of the shafts to be connected is small, as will be illustrated below by means of an exemplary embodiment.

According to another advantageous embodiment, the axial overall length of the shaft coupling according to the invention is kept small in particular when the heads of the studs connected to the connecting flanges are accommodated in a countersunk bore hole.

A further advantageous embodiment of the coupling according to the invention consists of those ends of the tension sleeves opposite the radially protruding end stop protruding with play into a borehole enlargement of the connecting flange or of the intermediate ring, and of the spacer rings being supported on the connecting flange or the intermediate ring. In this way installation of the coupling is further facilitated.

A particularly compact design of the shaft coupling according to the invention can be achieved if the connecting flanges and the intermediate ring comprise bore holes into which the end stops of the tension sleeves interact with play.

Another preferred embodiment of the shaft coupling according to the invention provides for one shell of each pair of coupling shells to comprise a groove for accommodating a feather key. In this way a positive-lock connection and thus a particularly safe torsionally rigid connection of the shaft ends is achieved.

BRIEF DESCRIPTION OF THE DRAWINGS

Below, the invention is explained in more detail by means of a drawing showing some embodiments, as follows.

DETAILED DESCRIPTION OF THE DRAWINGS

Figure 2:
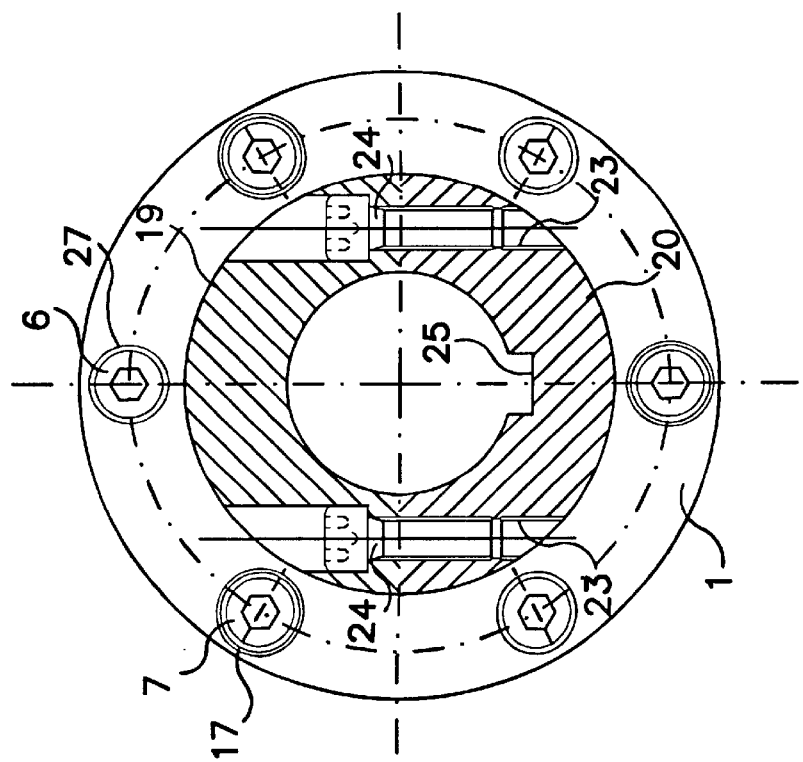
FIG. 2 is a cross-sectional view of the shaft coupling according to FIG. 1 in the area of the screw connection of a pair of coupling shells.

The shaft coupling shown in FIGS. 1 to 4 comprises two connecting flanges 1, 2 and an intermediate piece 3 in the form of an intermediate ring, arranged between the connecting flanges. A disk-packet ring 4, 5 is arranged between the connecting flanges 1, 2 and the intermediate piece 3 by means of circumferentially distributed studs 6, 7, tension sleeves 8, 9 and spacer rings 10 held on the tension sleeves, said disk-packet ring 4, 5 being alternately connected with the associated connecting flange and the intermediate piece.

Figure 1:
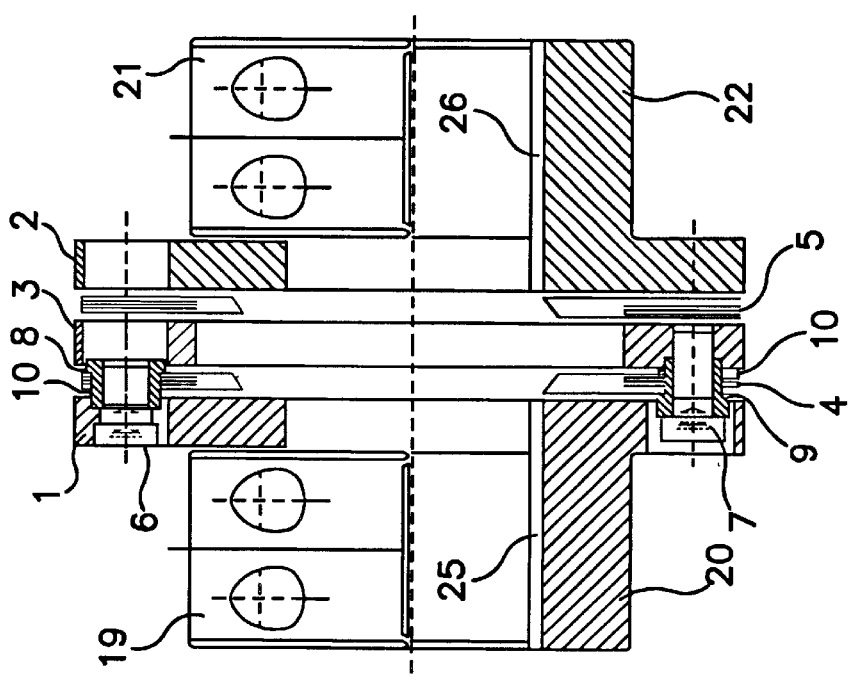
FIG. 1 is a longitudinal side view of a shaft coupling according to the invention in partial sectional representation.
Figure 3:
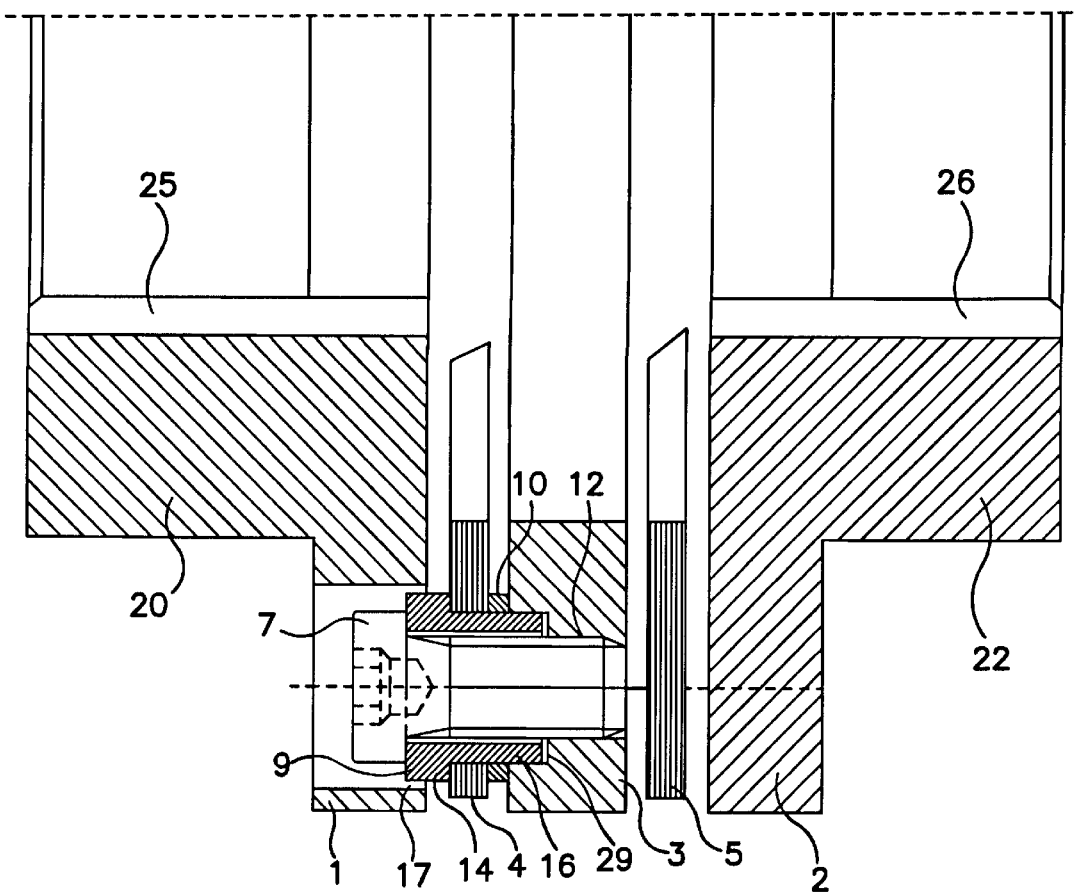
FIG. 3 is an enlarged longitudinal side view of the lower half of the coupling according to FIG. 1 in which the screw point of a disk packet at the intermediate piece arranged between the connecting flanges can be seen more easily.
Figure 4:
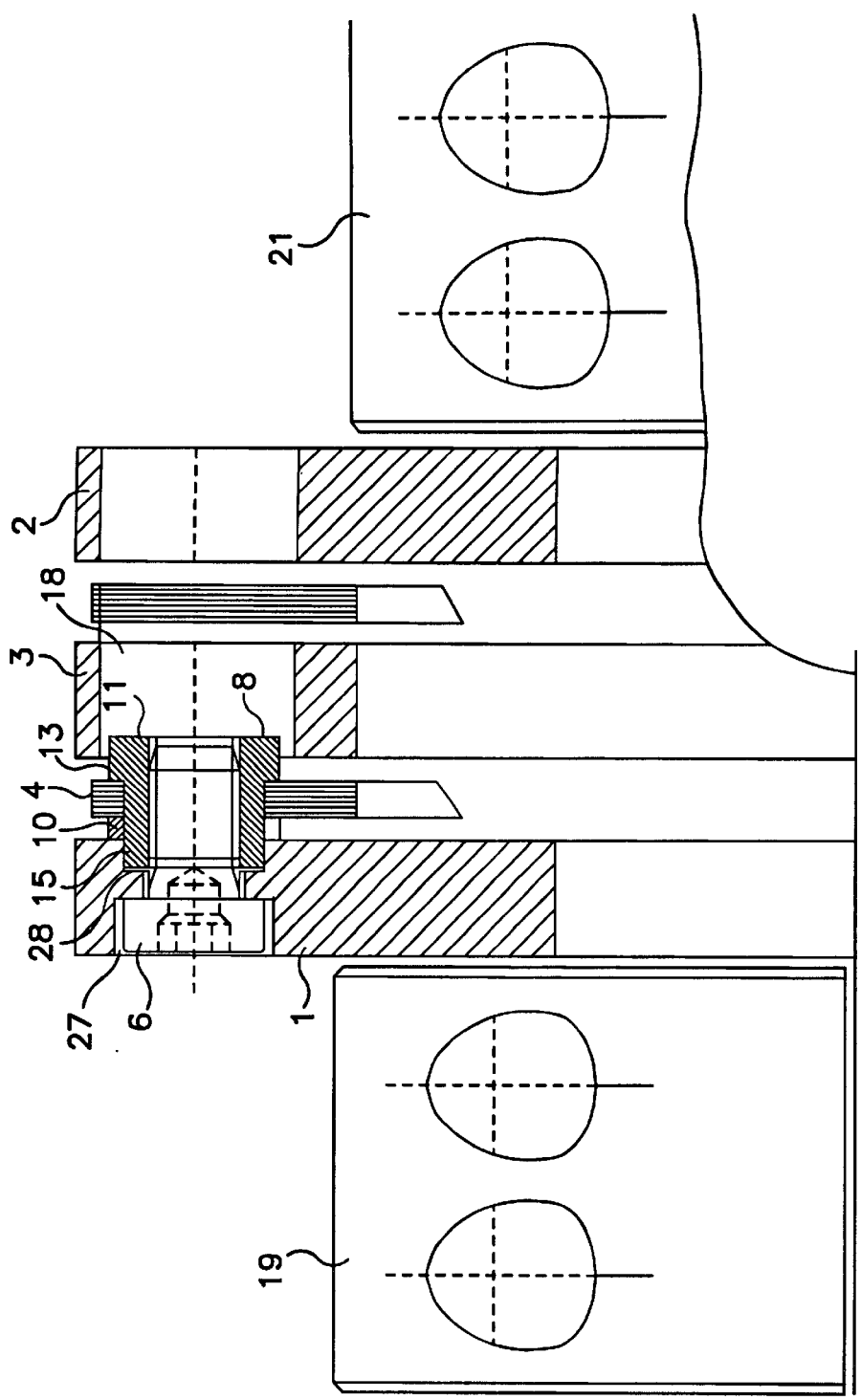
FIG. 4 is an enlarged sectional view of the upper half of the coupling according to FIG. 1 in which the screw point of a disk packet on one of the connection flanges is shown more clearly.

As shown in FIGS. 1 and 4, the tension sleeves 8 which are associated with the studs 6 connected to the connecting flanges 1, 2, comprise an internal screw thread 11 for fastening the studs 6. By contrast, the studs 7 connected to the intermediate ring 3 are screwed into the threaded bore holes 12 of the intermediate ring, as is shown in FIGS. 1 and 3. In the embodiment shown, the tension sleeves 9 which are associated with the studs 7 connected to the intermediate piece, do not comprise an internal screw thread. Consequently the studs 7 can simply be inserted with their respective threaded shaft through the tension sleeve 9 and screwed together with the associated threaded bore hole 12 in the intermediate ring 3.

The ends 15, 16, at the opposite end of the radially protruding end stops 13, 14, protrude with play into a countersunk bore hole 28, 29 of the connecting flange 1 or of the intermediate ring 3. The spacer rings 10 held on the tension sleeves 8, 9, are supported by the respective connecting flange 1 or the intermediate ring 3. FIGS. 3 and 4 also show that the connecting flanges 1, 2 as well as the intermediate ring 3 comprise bore holes 17, 18 into which the end stops 13, 14 of the tension sleeves 8, 9 protrude with radial play.

The connecting flanges 1, 2 of the shaft coupling are installed to the connecting shaft extremities (not shown) via pairs of coupling shells 19, 20 or 21, 22. One shell 20, 22 of each pair of coupling shells is made in one piece together with the associated connecting flange 1, 2. In the embodiment shown, this shell 20 (or 22) comprises an internal screw thread hole 23 so that the associated upper half of the shell 19 can be installed to it by means of hexagon socket screws 24 without the need for using nuts. In addition, the lower halves of shells 20, 22, made in one piece together with the connecting flanges 1, 2, each comprise a groove 25, 26 to accommodate a feather key.

The studs 6, 7 used to attach the disk packets are also hexagonal socket screws. As shown, the studs 6 and 7 differ in length. To achieve an especially short shaft coupling while at the same time enabling direct radial installation or deinstallation of the removable coupling shells 19, 21, the heads of the studs 6 connected to the connecting flanges are countersunk in a countersunk bore hole 27.

Figure 5:
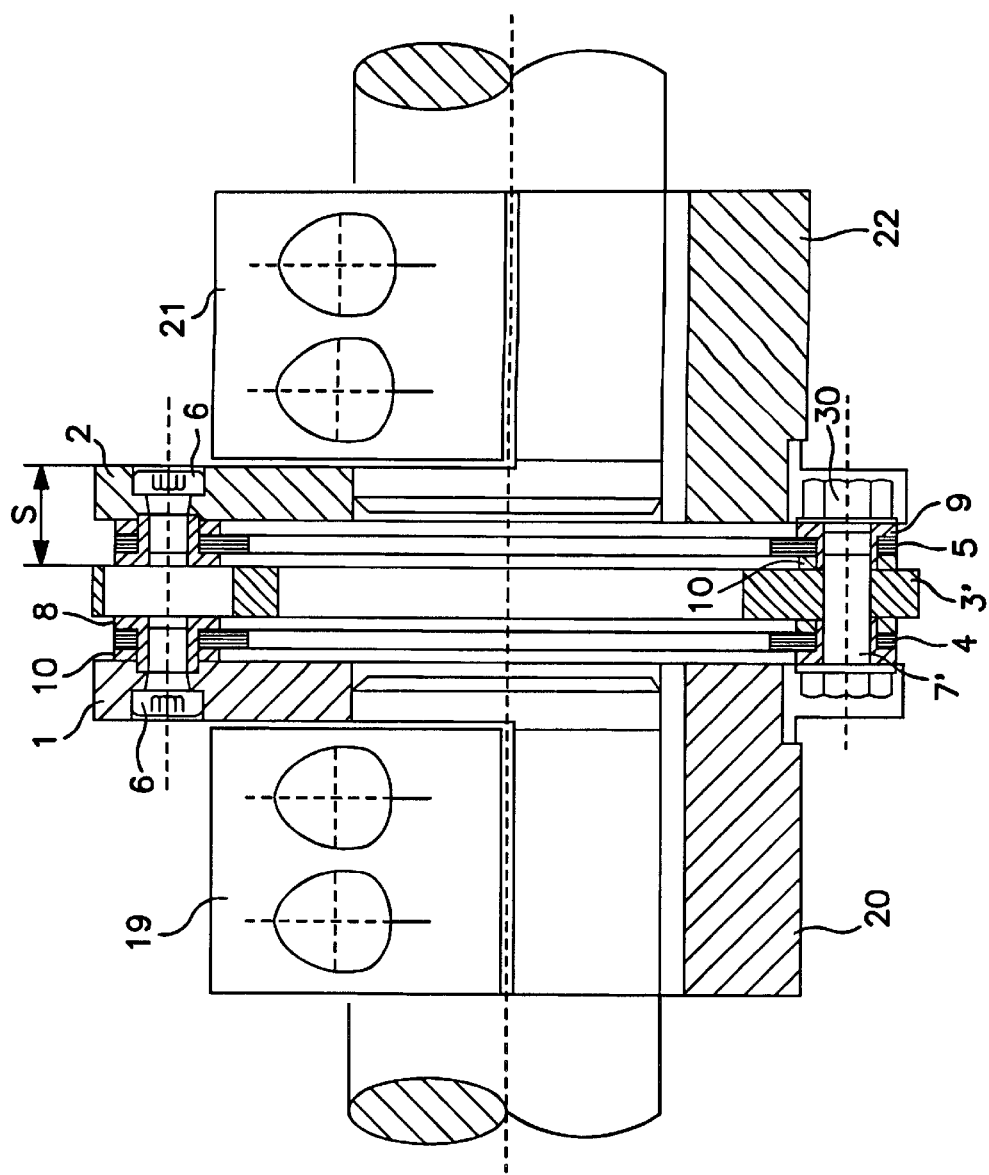
FIG. 5 is a longitudinal side view in partial cut-away representation of a second embodiment of a shaft coupling according to the invention.

FIG. 5 shows a second embodiment of the shaft coupling according to the invention. By contrast to the previously described embodiment, the studs 7' connected to the intermediate piece 3' connect both disk-packet rings 4, 5 to the intermediate piece 3'. Thus the ring-shaped intermediate piece 3' does not have threaded bore holes for attaching the studs 7', but instead, bore holes with close tolerances and no internal screw thread. The intermediate ring 3' is smaller in width than the intermediate ring 3 in the previously described embodiment. For attaching the disk packets 4, 5 to the intermediate ring 3', on both sides of the intermediate ring 3' the studs 7' comprise a tension sleeve 9 and a spacer ring 10 placed on top of the tension sleeve 9. The tension sleeves again comprise a radially protruding end-stop which in axial direction is supported at the head of the stud 7' or at the nut 30 located at the other extremity.

It is evident that with disk packets 4, 5 pre-installed at the connecting flanges 1, 2, installation or deinstallation is possible even with a relatively small space between the shafts because the minimum spacing required is solely determined by the dimension S, i.e. the distance between the shafts need only be slightly larger than the dimension S. Thus the preinstalled coupling sections comprising the hub with the removable halves of the pairs of coupling shells 19 or 21 and the disk packets 4 or 5 attached to the connecting flange 1 or 2 by means of the tension bolts 6 and the tension sleeves 8 as well as the spacer rings 10, can be installed or deinstalled between the shaft ends without any further disassembling. The intermediate disk 3' is then attached between the left section of the coupling and the right section of the coupling, using three studs 7'.

The application of the invention is not restricted to the exemplary embodiments described above, but instead, several variants are imaginable. For example in the embodiment shown in FIG. 5, the nut 30 can be left out and instead, the tension sleeve 9 arranged at the threaded end of the stud 7', can comprise an internal screw thread.

What is claimed is:

1. A flexible all-steel shaft coupling comprising:
   two connecting flanges (1, 2) and an intermediate piece (3, 3') arranged between the connecting flanges;
   at least one disk ring (4, 5) being arranged between each of the two connecting flanges and the intermediate piece;
   said at least one disk ring being connected alternately to one of the two connecting flanges and the intermediate piece, by means of two or more circumferentially-distributed studs (6, 7, 7') and two or more tension sleeves (8, 9);
   each of the two or more studs including a head portion;
   each of the two or more tension sleeves including a radially protruding end stop (13, 14), as well as one or more spacer rings (10) held on the tension sleeve, so that the two connecting flanges are interconnected so as to be torsionally rigid while permitting angular movement and axial movement;
   each of the two or more studs (6) being associated with only a respective one of the two or more tension sleeves,
   each of the two or more tension sleeves (8) including an internal screw thread for attachment to a corresponding stud;
   said intermediate piece (3, 3') is an intermediate ring; and
   each of the two connecting flanges including pairs of coupling shells (19, 20; 21, 22), with one of the shells (20, 22) of each pair of coupling shells being constructed in a single piece together with the respective associated connecting flange (1, 2).

2. A shaft coupling according to claim 1, characterised in that each of the two or more studs (7) connected to the intermediate ring is screwed into threaded bore holes provided in the intermediate ring (3).

3. A shaft coupling according to claim 1, characterised in that each of the two or more studs (7') connected to the intermediate ring in each instance connect the at least one disk ring (4, 5) to the intermediate ring (3').

4. A shaft coupling according to claim 1, characterised in that each of the head portions of the two or more studs (6) connected to the connecting flanges (1, 2) is accommodated in a countersunk bore hole (27).

5. A shaft coupling according to claim 1, characterised in that the ends (15, 16) of the two or more tension sleeves (8, 9) opposite the radially protruding end stop (13, 14) protrude with play into a bore-hole enlargement (28, 29) of at least one of the connecting flange (1, 2) and the intermediate ring (3), and in that the one or more spacer rings (10) are supported on at least one of the connecting flange (1, 2) and the intermediate ring (3).

6. A shaft coupling according to claim 1, characterised in that the connecting flanges (1, 2) and the intermediate ring (3) comprise bore holes (17, 18) with which the end stops (13, 14) of the two or more tension sleeves (8, 9) interact with play.

7. A shaft coupling according to claim 1, characterised in that one shell (20, 22) of each pair of coupling shells (19, 20; 21, 22) comprises a groove (25, 26) for accommodating a feather key.

* * * * *